US010015287B2

(12) United States Patent
Herrero et al.

(10) Patent No.: US 10,015,287 B2
(45) Date of Patent: Jul. 3, 2018

(54) EFFICIENT TUNNELED STREAMS FOR REAL-TIME COMMUNICATIONS

(71) Applicant: Oracle International Corporation, Redwood Shores, CA (US)

(72) Inventors: Rolando Herrero, Derry, NH (US); Henry Katz, Brookline, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 107 days.

(21) Appl. No.: 14/638,434

(22) Filed: Mar. 4, 2015

(65) Prior Publication Data
US 2016/0261559 A1 Sep. 8, 2016

(51) Int. Cl.
*H04L 29/06* (2006.01)
*H04L 12/46* (2006.01)

(52) U.S. Cl.
CPC .......... *H04L 69/16* (2013.01); *H04L 12/4633* (2013.01); *H04L 65/60* (2013.01); *H04L 67/42* (2013.01); *H04L 69/10* (2013.01); *H04L 69/163* (2013.01)

(58) Field of Classification Search
CPC ..... H04L 63/04; H04L 63/0272; H04L 65/80; H04L 65/4015; H04L 65/602; H04L 45/24; H04L 63/162
See application file for complete search history.

(56) References Cited

U.S. PATENT DOCUMENTS

| | | | |
|---|---|---|---|
| 6,061,796 A * | 5/2000 | Chen | H04L 12/4641 380/283 |
| 6,349,336 B1 | 2/2002 | Sit et al. | |
| 6,977,896 B1 * | 12/2005 | Kobayashi | H04L 29/06 370/235 |
| 7,136,377 B1 * | 11/2006 | Tweedly | H04L 12/4633 370/356 |
| 8,080,324 B2 | 12/2011 | Yamamoto | |
| 9,021,134 B1 * | 4/2015 | Patel | H04L 67/2823 709/246 |
| 9,071,514 B1 | 6/2015 | Hegde et al. | |
| 9,693,263 B2 * | 6/2017 | Grootwassink | H04W 28/12 |
| 2001/0052023 A1 * | 12/2001 | Lin | H04M 1/2471 709/237 |

(Continued)

OTHER PUBLICATIONS

Oracle Communications; Oracle Data Sheet; "ACME PACKET 4500"; http://www.oracle.com/us/industries/communications/acme-packet-4500-ds-1990148.pdf; last downloaded Oct. 20, 2014.

(Continued)

*Primary Examiner* — Harunur Rashid
(74) *Attorney, Agent, or Firm* — Potamac Law Group, PLLC (57) ABSTRACT

A system tunnels real-time communications ("RTC"). The system creates a connection between a tunneling client and a signaling server. The connection includes a stream-based tunnel between the tunneling client and a tunneling server and a stream connection between the tunneling server and the signaling server. The system then receives, from the tunneling client, stream traffic encapsulated as datagram traffic within the stream-based tunnel. The system translates the datagram traffic into the stream traffic, and forwards the stream traffic to the signaling server over the stream connection.

20 Claims, 5 Drawing Sheets

(56) References Cited

U.S. PATENT DOCUMENTS

| | | | |
|---|---|---|---|
| 2002/0114333 A1* | 8/2002 | Xu | H04L 29/125 370/392 |
| 2002/0122416 A1* | 9/2002 | Xu | H04L 29/125 370/352 |
| 2005/0076126 A1* | 4/2005 | Knight | H04L 63/0281 709/227 |
| 2007/0025395 A1* | 2/2007 | Cardona | H04L 69/16 370/474 |
| 2009/0080418 A1* | 3/2009 | Koide | H04L 12/4633 370/389 |
| 2009/0164655 A1* | 6/2009 | Pettersson | H04L 65/4015 709/231 |
| 2011/0099619 A1 | 4/2011 | Jewell | |
| 2011/0202610 A1 | 8/2011 | Chaturvedi et al. | |
| 2013/0283037 A1* | 10/2013 | Katz | H04L 63/04 713/151 |
| 2015/0188943 A1* | 7/2015 | Williams | H04L 63/0272 713/151 |
| 2015/0382240 A1* | 12/2015 | Hecht | H04L 69/22 370/316 |
| 2016/0255394 A1* | 9/2016 | Yang | H04N 21/434 725/131 |

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).

\* cited by examiner

EFFICIENT TUNNELED STREAMS FOR REAL-TIME COMMUNICATIONS

FIELD

One embodiment is directed generally to a communications network, and in particular, to delivering real-time traffic over a communications network.

BACKGROUND INFORMATION

Many enterprises have moved from telephony services using the Public Switched Telephone Network ("PSTN") (provided by a traditional telephone company) to telephony services using the Internet Protocol ("IP") (provided by an IP Telephony service provider). Such services are commonly known as Voice over IP ("VoIP") or IP Telephony. IP Telephony uses an IP network (e.g., the Internet) as a backbone and can thus provide advanced features such as video conferencing, call recording, and call forwarding.

Recently, driven by the growing base of mobile data subscribers, ubiquitous Internet access, and high bandwidth that is now available in both fixed and mobile networks, advanced services accessed via the Internet (known as Over-the-Top ("OTT") services) have become popular. However, while OTT services threaten traditional telephony offerings, innovative service providers are introducing their own OTT services, and must therefore overcome a number of unique challenges as they deploy and market these new services.

SUMMARY

One embodiment is a system that tunnels real-time communications ("RTC"). The system creates a connection between a tunneling client and a signaling server. The connection includes a stream-based tunnel between the tunneling client and a tunneling server and a stream connection between the tunneling server and the signaling server. The system then receives, from the tunneling client, stream traffic encapsulated as datagram traffic within the stream-based tunnel. The system translates the datagram traffic into the stream traffic, and forwards the stream traffic to the signaling server over the stream connection.

DETAILED DESCRIPTION

One embodiment provides real-time communications ("RTC") services in a network environment by efficiently tunneling inner streams within a stream-based tunnel. In one embodiment, a server implements a stream-based tunnel such that inner streams are encapsulated as datagram traffic within an outer stream. Since datagram traffic is configured for low-overhead operation and reduced latency rather than error checking and delivery validation, embodiments result in more efficient tunneling, while still meeting stream requirements (e.g., ordered delivery, error checking, etc.) due to the outer stream.

Figure 1:
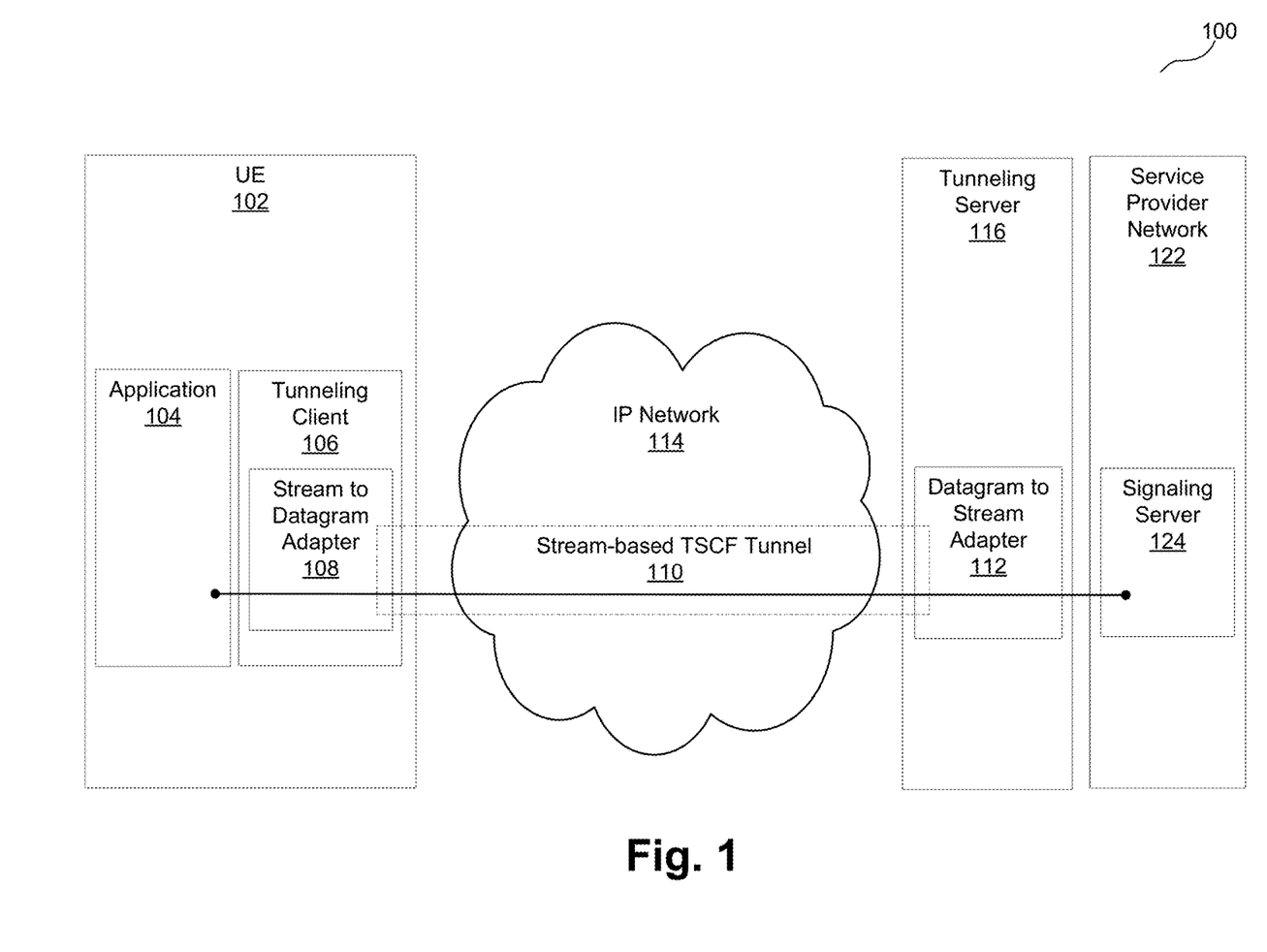
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network 122. RTC refers to a mode of communication in which users exchange information instantly or with negligible latency. Example applications for RTC include voice and/or video calls, application streaming, softphones, and remote desktop applications. UE 102 may be any device used by an end-user for communication, such as a smartphone, a laptop computer, a tablet, etc.

In performing RTC, UE 102 communicates signaling traffic with a signaling server 124 in service provider network 122 according to an application layer protocol such as the Session Initiation Protocol ("SIP"). SIP is a signaling communications protocol, conventionally used for controlling multimedia communication sessions such as voice and video calls over IP networks. SIP is configured to be independent of the underlying transport layer. Accordingly, SIP can run on different transport protocols, such as the Transmission Control Protocol ("TCP"), the User Datagram Protocol ("UDP"), etc. TCP is one of the core protocols of the IP suite and provides reliable, ordered, and error-checked delivery of a stream of octets between programs running on computers connected to an IP network such as a local area network, an intranet, or the public Internet. A datagram is a basic transfer unit associated with a packet-switched network for which the delivery, arrival time, and order of arrival need not be guaranteed by the network. UDP is a protocol that uses a simple connectionless transmission model with a minimum of protocol mechanisms. Applications that do not require the reliability of a TCP connection may instead use UDP which emphasizes low-overhead operation and reduced latency rather than error checking and delivery validation.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which being incorporated herein by reference. In general, using a tunnel for communication refers to using a delivery protocol to encapsulate a different payload protocol. The TSCF standard provides client side and server side network elements for establishing managed Transport Layer Security ("TLS") tunnels for performing RTC. TLS is a cryptographic protocol configured to provide communication security over the Internet. TLS is an Internet Engineering Task Force ("IETF") standards track protocol as provided in, for example, IETF request for comments ("RFC") 2246, RFC 4346, RFC 5246, and/or RFC 6176.

In one embodiment, tunneling client 106 and tunneling server 116 establish and manage a stream-based TSCF tunnel 110 according to the TSCF standard. Stream-based TSCF tunnel 110 encapsulates traffic within an outer stream protocol (e.g., TCP) to provide reliable, ordered, and error-checked delivery of a stream. In this embodiment, UE 102 may use stream-based TSCF tunnel 110 to traverse security devices (e.g., firewalls, proxies, etc.) and connect to tunneling server 116 to reach service provider network 122 for performing RTC. In one embodiment, UE 102 may, for example, execute a SIP based RTC application (e.g., application 104) that relies on a library such as the software development kit ("SDK") provided by the tunneled session management solution from Oracle Corp.

Figure 2:
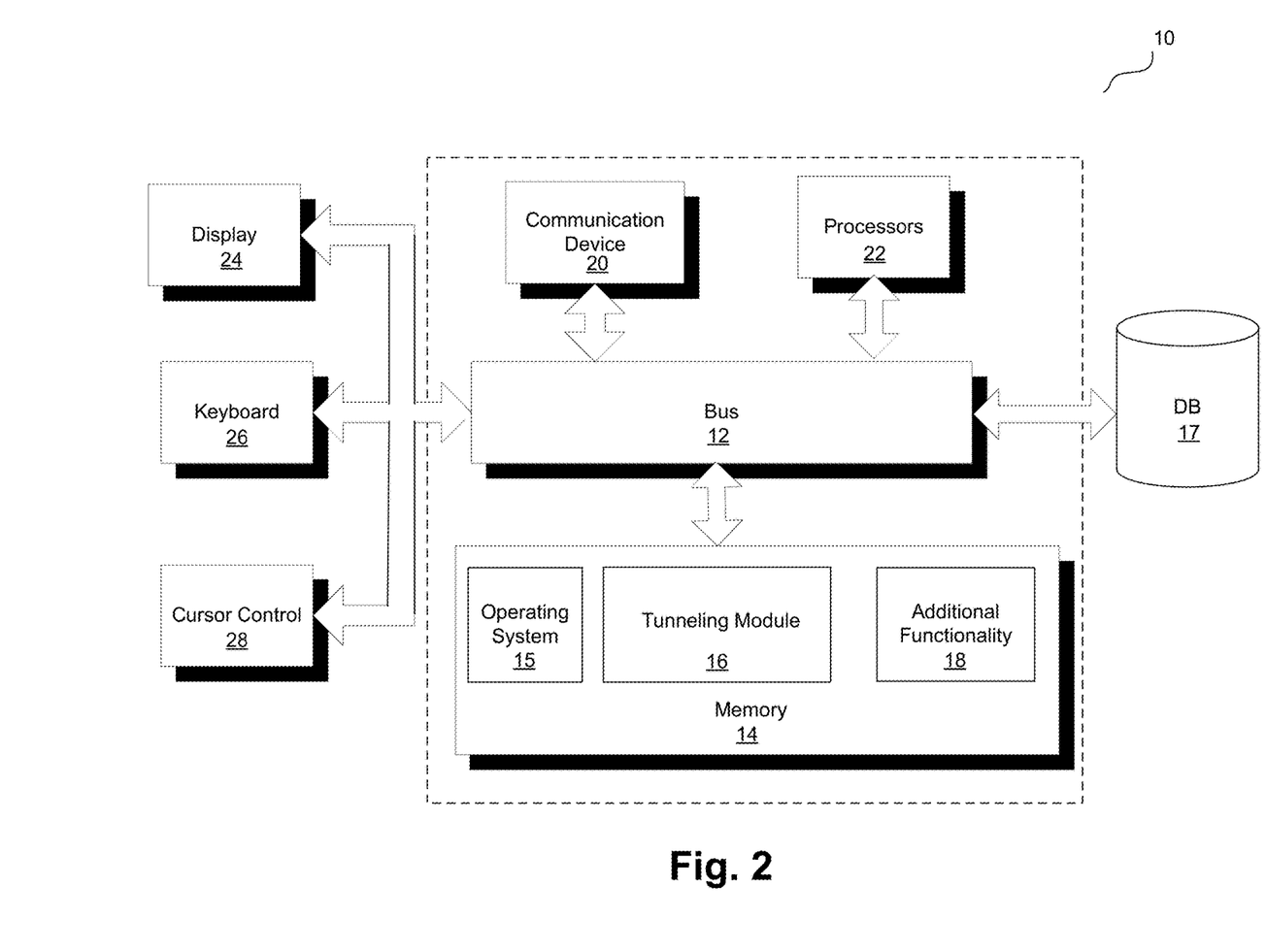
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a tunneling server 116, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of transitory or non-transitory computer-readable medium. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a tunneling module 16 for providing tunneling, and all other functionality disclosed herein. In one example embodiment, tunneling module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for tunneling module 16 and additional functional modules 18. In one example embodiment, tunneling module 16 and/or additional functional modules 18 may include a creating module that creates a connection between a tunneling client and a signaling server, a receiving module that receives, from the tunneling client, stream traffic encapsulated as datagram traffic within the stream-based tunnel, a translating module a translating module that translates the datagram traffic into the stream traffic, and a forwarding module that forwards the stream traffic to the signaling server over the stream connection, as will be described herein with reference to FIG. 5.

Referring again to FIG. 1, with known systems, stream-based TSCF tunnel 110 encapsulates inner stream signaling traffic within a stream-based delivery protocol. Table 1 provides an example of protocol layers when TCP data is encapsulated in a TCP/TLS tunnel.

TABLE 1

Example protocol layers when TCP data
is encapsulated in a TCP/TLS tunnel

| Application Data |
| Inner TCP |
| Inner IP |
| Outer TCP |
| Outer IP |
| Ethernet |

As shown in Table 1, although TCP resides at the transport layer, in the context of tunneling it is transported on top of IP and encapsulated over the tunnel application layer. One disadvantage with this configuration is that encapsulating stream-based traffic in a stream-based tunnel may introduce levels of latency that are unacceptable for real-time media communications when network 100 is degraded and subject to packet loss. For example, when TCP data is encapsulated in a TCP/TLS tunnel, data transmissions become very sensitive to packet loss since each TCP transport stack reacts to packet loss by generating timed retransmissions, and the resulting interactions between the two nested TCP transport stacks introduce levels of latency that seriously degrade the quality of RTC. For example, when the two nested TCP transport stacks react to packet loss, two different timers fire off at different time instances, causing retransmissions of retransmitted payloads and degrading the overall quality of communication.

One known solution to reduce such latency is to modify the application codes to change inner TCP sockets to inner UDP sockets. A network socket is an endpoint of an inter-process communication flow across a computer network which is the point for sending or receiving packet delivery services. A datagram socket is a type of connectionless network socket. Each packet sent or received on a datagram socket is individually addressed and routed. A stream socket is a type of connection-oriented and sequenced network socket which provides functionality for creating and destroying connections and for detecting errors.

One disadvantage with this known solution is that it is costly and resource intensive. Further, this solution may not even be always possible due to limitations of voice over IP ("VoIP") network architecture at the application layer which prevent using UDP-based SIP instead of TCP-based SIP.

In contrast to the known solutions, embodiments of the present invention allow inner stream applications to communicate over stream-based tunnels without being affected by the cumulative latency of two nested stream stacks (e.g., an inner TCP stack corresponding to an inner TCP application and an outer TCP stack corresponding to a TCP/TLS tunnel) under packet loss conditions. In one embodiment, since the outer transport layer of stream-based TSCF tunnel 110 provides functionality for reliable transmission, the inner TCP layer of application 104 is modified to behave as datagram traffic while preserving the same software interface with TCP sockets. This functionality is provided by a stream to datagram adapter 108 in tunneling client 106 and a datagram to stream adapter 112 in tunneling server 116.

One embodiment provides SDK socket APIs that are configured such that whenever an inner TCP socket is created at UE 102, it internally behaves as a datagram socket as viewed by application 104. Accordingly, embodiments transparently perform RTC within a TSCF tunnel while avoiding a double stream stack, and improve latency without requiring modifications to end user applications. Also, by switching an inner stream with an inner datagram, embodiments increase throughput and improve the overall network performance which would have been otherwise compromised in case of, for example, heavy packet loss.

One embodiment provides control messages for creation and termination of connections for communicating stream traffic encapsulated as datagram traffic within a stream-based tunnel. According to the TSCF standard, control messages between tunneling clients and a tunneling server are of a "request/response" type, and a control message response to a request includes either a corresponding reply or an error code indicating why the request could not be honored. TSCF control messages utilize a Type Length Value ("TLV") encoding. TLV is defined as the variable length concatenation of a unique Type (represented by an integer) and a Value containing the actual value identified by the Type.

In one embodiment, both tunneling client 106 and tunneling server 116 keep track of the connections between tunneling client 106 and signaling server 124 and map them to source and destination addresses and transport ports. This embodiment provides TSCF service request control messages with message types "Connection_Creation" and "Connection_Termination" (to create and terminate connections, respectively) that include "Connection_Information" TLVs indicating source and destination endpoints. The corresponding TSCF service response control messages provide a 16-bit "Connection_Id" TLV that is subsequently used as a reference to the connection. In one embodiment, when terminating a connection upon receiving a TCP FIN message from signaling server 124, tunneling server 116 translates the TCP FIN message into a TSCF service request control message of type "Connection_Termination" that includes a corresponding connection identifier as a TLV.

In one embodiment, a "Connection_Info" TLV is provided to identify source and destination end points, and a "Connection_Id" TLV is provided to identify the newly created connection. Further, an error code TLV is used to indicate error conditions, such as in the case where a server is not configured to support this feature or when the connection cannot be established. Table 2 provides examples of such TLVs for TSCF service request and response control messages, according to some present embodiments.

TABLE 2

Example TLVs for TSCF service request and response control messages, according to some embodiments

| TLV Type | | | SHORT/LONG | | | |
|---|---|---|---|---|---|---|
| NAME | Value | SEMANTICS | FORMAT | VALUE TYPE | LENGTH | NOTES |
| Connection_Info_IPv4 | 24 | Connection Info | Short | Octet string | | |
| Connection_Info_IPv6 | 25 | Connection Info | Short | Octet string | | |
| Service_Type | 27 | Service Type | Short | Unsigned integer | 1 byte | Connection_Creation = 7 Connection_Termination = 8 |
| Connection_Id | 35 | Connection Identifier | Short | Unsigned integer | 1 byte | |

Table 3 provides an example datagram packet configuration used for sending stream traffic, including a combination of headers and payload.

TABLE 3

An example datagram packet configuration used for sending stream traffic

| 0x80 | id (hi) | id (lo) | len (hi) | len (lo) | payload |
|---|---|---|---|---|---|

In the configuration of Table 3, the first byte (denoted as 0x80) indicates the presence of a datagram packet. Both the connection identifier and the payload length are encoded as 16-bit numbers into high and low bytes. The pure stream data is encoded as payload. Since this configuration corresponds to datagram traffic, it does not include acknowledgment or ordering information. However, acknowledgment and ordering information are provided by the outer stream transport layer corresponding to stream-based TSCF tunnel 110 of FIG. 1. In these embodiments, tunneling server 116 translates such inner datagrams into plain stream packets (e.g., plain TCP packets).

Embodiments use the same APIs that create or terminate stream sockets. However, if UE 102 and tunneling server 116 include functionality for sending stream traffic as datagram traffic within a stream-based tunnel, this functionality takes precedence (over using nested streams) when creating stream sockets, and stream data propagation is carried out through standard inner datagram transmissions. One embodiment provides this functionality only when the tunnel transport is stream-based (e.g., TCP or TLS based). The following are example TSC socket functions affected by this functionality.

int tsc_socket (tsc_handle handle, int af, int type, int
        protocol);
    int tsc_bind (int s, struct sockaddr *addr, int namelen);
    int tsc_close (int s);
    int tsc_ioctl (int s, long cmd, unsigned long *argp);
    int tsc_getsockname (int s, struct sockaddr *name, sock-
        len_t *namelen);
    int tsc_getpeername (int s, struct sockaddr *name, sock-
        len_t *namelen);
    int tsc_setsockopt (int s, int level, int optname, char
        *optval, int optlen);

```
int tsc_getsockopt (int s, int level, int optname,
    char *optval, int *optlen);
int tsc_shutdown (int s, int how);
int tsc_fcntl (int s, int cmd, long arg);
int tsc_select (int nfds, tsc_fd_set * readfds, tsc_fd_set *
    writefds, tsc_fd_set * exceptfds, struct tsc_time-
    val *timeout);
int tsc_poll (struct tsc_pollfd *fds, tsc_nfds_t nfds, int
    timeout);
int tsc_connect (int s, struct sockaddr *name, int
    namelen);
int tsc_accept (int s, struct sockaddr *addr, int *addrlen);
int tsc_listen (int s, int backlog);
int tsc_recv (int s, char *buf, int len, int flags);
int tsc_send (int s, char *buf, int len, int flags);
```

Figure 3:
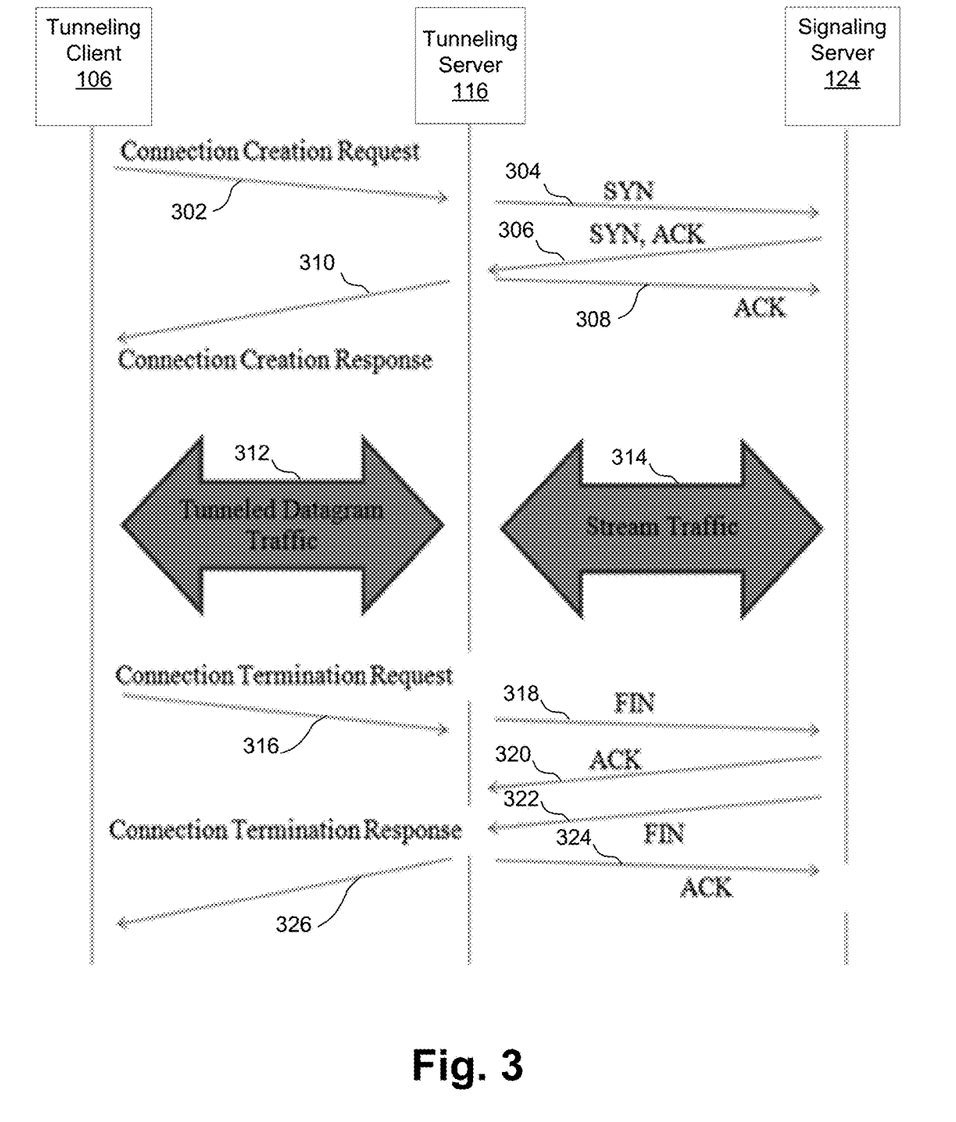
FIGS. 3 and 4 are message sequence diagrams corresponding to the operation of the tunneling module of FIG. 2 when performing tunneling in accordance with embodiments of the present invention.

FIG. 3 is an example message sequence diagram corresponding to messaging transactions when tunneling client 106 initiates a connection with signaling server 124 through tunneling server 116, according to some embodiments. Message sequence diagram of FIG. 3 includes network elements such as tunneling client 106, tunneling server 116, and signaling server 124, as described herein with reference to FIG. 1.

At 302, tunneling client 106 sends a TSCF service request control message (e.g., a "connection creation request" message) to tunneling server 116 to request a connection with signaling server 124.

At 304, tunneling server 116 translates the TSCF service request control message of tunneling client 106 into a plain TCP connection creation packet (e.g., a "SYN" message) and forwards it to signaling server 124.

At 306, signaling server 124 acknowledges the receipt of the TCP connection creation packet by responding to the tunneling server 116 with a corresponding TCP packet (e.g., a "SYN, ACK" message).

At 308, tunneling server 116 acknowledges the receipt of the TCP packet from signaling server 124 by sending a corresponding TCP message (e.g., an "ACK" message) to signaling server 124.

At 310, tunneling server 116 translates the TCP response of signaling server 124 into a TSCF service response control message (e.g., a "connection creation response" message) and forwards it to tunneling client 106.

At this point, tunneling client 106 and signaling server 124 may begin communicating a stream through tunneling server 116.

For example, at 312, tunneling client 106 communicates tunneled datagram traffic to tunneling server 116, and at 314, tunneling server 116 forwards that traffic as stream traffic to signaling server 124, and vice versa.

In order to terminate the connection, at 316, tunneling client 106 sends a TSCF service request control message (e.g., a "connection termination request" message) to tunneling server 116 to request termination of the connection with signaling server 124.

At 318, tunneling server 116 translates the TSCF service request control message of tunneling client 106 into a plain TCP connection termination packet (e.g., a "FIN" message) and forwards it to signaling server 124.

At 320, signaling server 124 acknowledges the receipt of the TCP connection termination packet by responding to the tunneling server 116 with a corresponding TCP packet (e.g., an "ACK" message).

At 322, signaling server 124 indicates the termination of the TCP connection to tunneling server 116 by sending a corresponding TCP packet (e.g., a "FIN" message).

At 324, tunneling server 116 acknowledges the receipt of the TCP packet from signaling server 124 by sending a corresponding TCP message (e.g., an "ACK" message) to signaling server 124.

At 326, tunneling server 116 translates the TCP response of signaling server 124 into a TSCF service response control message (e.g., a "connection termination response" message) and forwards it to tunneling client 106. At this time the connection is terminated.

Figure 4:
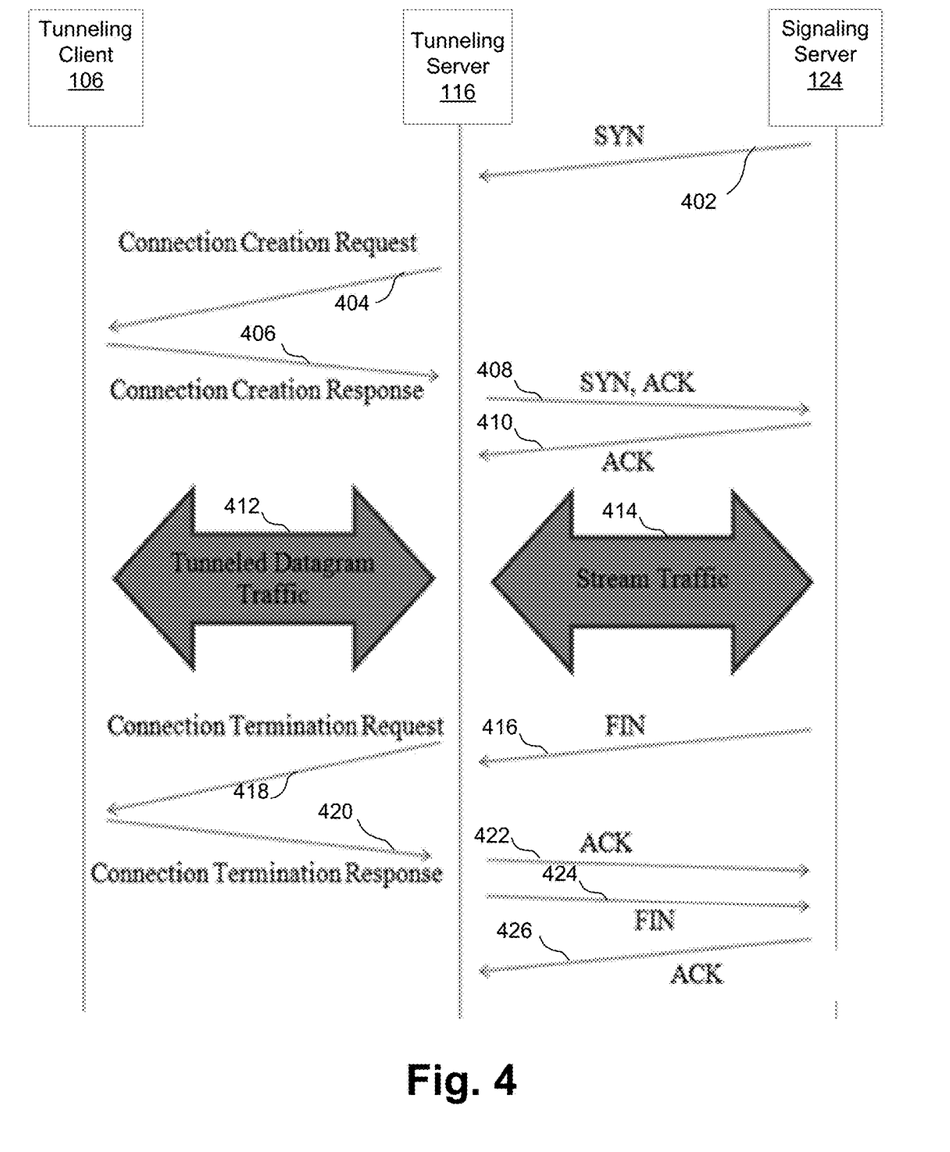

FIG. 4 is an example message sequence diagram corresponding to messaging transactions when signaling server 124 initiates a connection with tunneling client 106 through tunneling server 116, according to some embodiments. Message sequence diagram of FIG. 4 includes network elements such as tunneling client 106, tunneling server 116, and signaling server 124, as described herein with reference to FIG. 1.

At 402, signaling server 124 sends a plain TCP connection creation packet (e.g., a "SYN" message) to tunneling server 116 to request a connection with tunneling client 106.

At 404, tunneling server 116 translates the TCP connection creation packet of signaling server 124 into a corresponding TSCF service request control message (e.g., a "connection creation request" message) and forwards it to tunneling client 106.

At 406, tunneling client 106 responds to the TSCF service request control message of tunneling server 116 with a corresponding TSCF service response control message (e.g., a "connection creation response" message).

At 408, upon receiving the response from tunneling client 106, signaling server 124 acknowledges the TCP connection creation packet of signaling server 124 by responding to signaling server 124 with a corresponding TCP packet (e.g., a "SYN, ACK" message).

At 410, signaling server 124 acknowledges the receipt of the TCP packet from tunneling server 116 by sending a corresponding TCP message (e.g., an "ACK" message) to tunneling server 116.

At this point, tunneling client 106 and signaling server 124 may begin communicating a stream through tunneling server 116. For example, at 412, tunneling client 106 communicates tunneled datagram traffic to tunneling server 116, and at 414, tunneling server 116 forwards that communication as stream traffic to signaling server 124, and vice versa.

In order to terminate the connection, at 416, signaling server 124 sends a TCP packet to tunneling server 116 (e.g., a "FIN" message) to request termination of the connection with tunneling client 106.

At 418, tunneling server 116 translates the TCP message of signaling server 124 into a corresponding TSCF service request control message (e.g., a "connection termination request" message) and forwards it to tunneling client 106.

At 420, tunneling client 106 responds to tunneling server 116 by sending a corresponding TSCF service response control message (e.g., a "connection termination response message").

At 422, upon receiving the response from tunneling client 106, tunneling server 116 acknowledges the receipt of the TCP connection termination packet of signaling server 124 by responding with a corresponding TCP packet (e.g., an "ACK" message).

At 424, tunneling server 116 indicates the termination of the TCP connection to signaling server 124 by sending a corresponding TCP packet (e.g., a "FIN" message).

At 426, signaling server 124 acknowledges the receipt of the TCP packet from tunneling server 116 by sending a corresponding TCP message (e.g., an "ACK" message) to tunneling server 116. At this time the connection is terminated.

Figure 5:
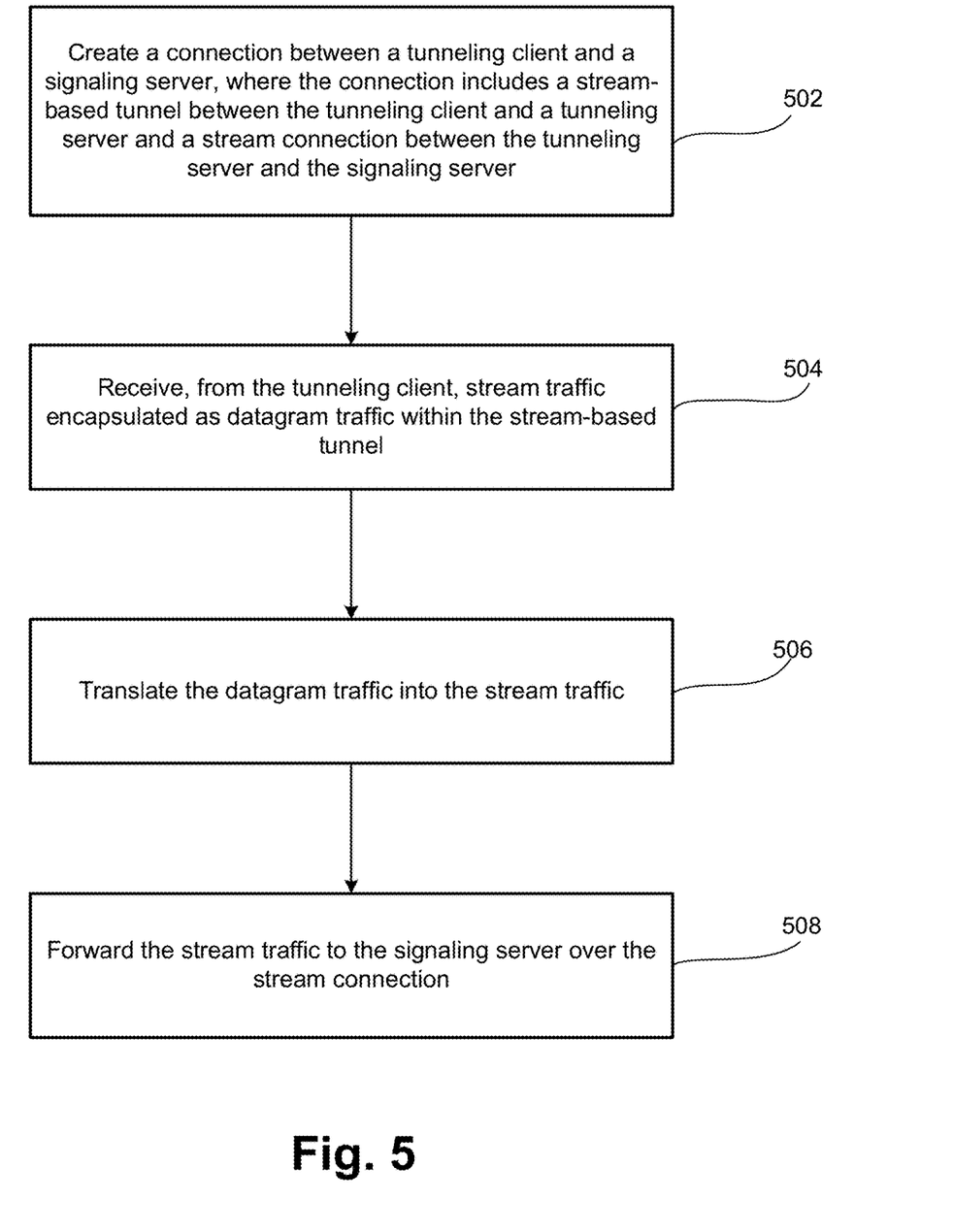
FIG. 5 is a flow diagram of the operation of the tunneling module of FIG. 2 when performing tunneling in accordance with embodiments of the present invention.

FIG. 5 is a flow diagram of tunneling module 16 of FIG. 2 and/or tunneling server 116 of FIG. 1 when performing tunneling in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, a connection is created between tunneling client 106 and signaling server 124 through tunneling server 116. The connection includes stream-based TSCF tunnel 110 between tunneling client 106 and tunneling server 116, and a stream connection between tunneling server 116 and signaling server 124. In one embodiment, the connection is initiated by tunneling client 106 by sending a service request control message according to TSCF, and tunneling server 116 translates this service request control message to a corresponding TCP packet and forwards it to signaling server 124. The service request control message includes a TSCF TLV indicating source and destination information corresponding to the connection. Signaling server 124 responds to the TCP packet a corresponding TCP packet, which is translated by tunneling server 116 into a service response control message and forwarded to tunneling client 106. The service response control message includes a TSCF TLV indicating a connection identifier corresponding to the connection. In an alternative embodiment, the connection is initiated by signaling server 124 by sending a corresponding TCP packet to tunneling server 116, which translates it into a service request control message and forwards it to tunneling client 106.

At 504, tunneling server 116 receives traffic from tunneling client 106, where the traffic corresponds to stream traffic encapsulated as datagram traffic within stream-based TSCF tunnel 110.

At 506, tunneling server 116 translates the datagram traffic into the stream traffic, and at 508, tunneling server 116 forwards the stream traffic to signaling server 124 over the stream connection.

In one embodiment, tunneling client 106 terminates the connection by sending a service request control message to tunneling server 116, which translates it into a corresponding TCP packet and forwards it to signaling server 124. Alternatively, the connection may be terminated by signaling server 124 according to embodiments described herein with reference to FIG. 4.

As disclosed, embodiments allow for a TSCF tunneling configuration that reduces the latency introduced by inner and outer TCP stacks by changing the behavior of the inner transport stack. In one embodiment, an inner stream is switched to an inner datagram to transparently perform RTC within a stream-based TSCF tunnel while avoiding a double stream stack, without requiring modifications to end user applications. Accordingly, embodiments give the end user the possibility of improving the overall network performance which would have been otherwise compromised when there is heavy packet loss.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform tunneling for real-time communications (RTC), the performing comprising:
creating a connection between a tunneling client on a user equipment configured to execute an application and a signaling server configured to receive signaling traffic within a service provider network , the creating including
opening a stream-based tunnel between the tunneling client and a tunneling server interposed between the user equipment and the signaling server; and
subsequently to the opening the stream-based tunnel, opening a stream connection between the tunneling server and the signaling server;
encapsulating a plurality of inner streams from the user equipment as datagram traffic;
receiving at the tunneling server, from the tunneling client, the datagram traffic including the encapsulated plurality of inner streams within the stream-based tunnel, wherein the datagram traffic behaves as a connectionless transmission;
translating the datagram traffic at the tunneling server into stream traffic using a socket application programming interface (API), wherein an inner transmission control protocol (TCP) layer of the application is modified to behave as the datagram traffic while preserving a same software interface with TCP sockets; and
transmitting the stream traffic from the tunneling server to the signaling server over the stream connection.

2. The non-transitory computer-readable medium of claim 1,
wherein the connection is initiated by the tunneling client by sending a service request control message according to a tunneled services control function (TSCF) standard;
wherein the tunneling server translates the service request control message to a first TCP packet for initiating the connection;
wherein the tunneling server forwards the first TCP packet to the signaling server; and
wherein the encapsulating and the translating avoids creating a double stream stack.

3. The non-transitory computer-readable medium of claim 2,
wherein the service request control message includes a first TSCF Type Length Value (TLV) indicating source and destination information corresponding to the connection.

4. The non-transitory computer-readable medium of claim 3,
wherein, in response to the first TCP packet, the tunneling server receives a second TCP packet from the signaling server;
wherein the tunneling server translates the second TCP packet into a service response control message according to TSCF; and
wherein the tunneling server forwards the service response control message to the tunneling client.

5. The non-transitory computer-readable medium of claim 4,
wherein the service response control message includes a second TSCF TLV indicating a connection identifier corresponding to the connection.

6. The non-transitory computer-readable medium of claim 1,
wherein the connection is terminated by the tunneling client by sending a service request control message according to a tunneled services control function (TSCF) standard;
wherein the tunneling server translates the service request control message to a transmission control protocol (TCP) packet for terminating the connection; and
wherein the tunneling server forwards the TCP packet to the signaling server.

7. The non-transitory computer-readable medium of claim 1,
wherein the connection is initiated by the signaling server by sending a transmission control protocol (TCP) packet to tunneling server for initiating the connection;
wherein the tunneling server translates the TCP packet into a service request control message for initiating the connection according to a tunneled services control function (TSCF) standard; and
wherein the tunneling server forwards the service request control message to the tunneling client.

8. A method of tunneling for real-time communications (RTC), comprising:
creating a connection between a tunneling client on a user equipment configured to execute an application and a signaling server configured to receive signaling traffic within a service provider network, the creating including
opening a stream-based tunnel between the tunneling client and a tunneling server interposed between the user equipment and the signaling server; and
subsequently to the opening the stream-based tunnel, opening a stream connection between the tunneling server and the signaling server;
encapsulating a plurality of inner streams from the user equipment as datagram traffic;
receiving at the tunneling server, from the tunneling client, the datagram traffic including the encapsulated plurality of inner streams within the stream-based tunnel, wherein the datagram traffic behaves as a connectionless transmission;
translating the datagram traffic at the tunneling server into stream traffic using a socket application programming interface (API), wherein an inner transmission control protocol (TCP) layer of the application is modified to behave as the datagram traffic while preserving a same software interface with TCP sockets; and
transmitting the stream traffic from the tunneling server to the signaling server over the stream connection.

9. The method of claim 8,
wherein the connection is initiated by the tunneling client by sending a service request control message according to a tunneled services control function (TSCF) standard;
wherein the tunneling server translates the service request control message to a first TCP packet for initiating the connection;
wherein the tunneling server forwards the first TCP packet to the signaling server; and
wherein the encapsulating and the translating avoids creating a double stream stack.

10. The method of claim 9,
wherein the service request control message includes a first TSCF Type Length Value (TLV) indicating source and destination information corresponding to the connection.

11. The method of claim 10,
wherein, in response to the first TCP packet, the tunneling server receives a second TCP packet from the signaling server;
wherein the tunneling server translates the second TCP packet into a service response control message according to TSCF; and
wherein the tunneling server forwards the service response control message to the tunneling client.

12. The method of claim 11,
wherein the service response control message includes a second TSCF TLV indicating a connection identifier corresponding to the connection.

13. The method of claim 8,
wherein the connection is terminated by the tunneling client by sending a service request control message according to a tunneled services control function (TSCF) standard;
wherein the tunneling server translates the service request control message to a transmission control protocol (TCP) packet for terminating the connection; and
wherein the tunneling server forwards the TCP packet to the signaling server.

14. The method of claim 8,
wherein the connection is initiated by the signaling server by sending a transmission control protocol (TCP) packet to tunneling server for initiating the connection;
wherein the tunneling server translates the TCP packet into a service request control message for initiating the connection according to a tunneled services control function (TSCF) standard; and
wherein the tunneling server forwards the service request control message to the tunneling client.

15. A system for tunneling of real-time communications (RTC), comprising:
a hardware processor configured to:
create a connection between a tunneling client on a user equipment configured to execute an application and a signaling server configured to receive signaling traffic within a service provider network, the creation of the connection including
opening a stream-based tunnel between the tunneling client and a tunneling server interposed between the user equipment and the signaling server; and
subsequently to the opening the stream-based tunnel, opening a stream connection between the tunneling server and the signaling server
encapsulate a plurality of inner streams from the user equipment as datagram traffic;
receive at the tunneling server, from the tunneling client, the datagram traffic including the encapsulated plurality of inner streams within the stream-based tunnel, wherein the datagram traffic behaves as a connectionless transmission;
translate the datagram traffic at the tunneling server into stream traffic using a socket application programming interface (API), wherein an inner transmission control protocol (TCP) layer of the application is modified to behave as the datagram traffic while preserving a same software interface with TCP sockets; and
transmit the stream traffic from the tunneling server to the signaling server over the stream connection.

16. The system of claim 15,
wherein the connection is initiated by the tunneling client by sending a service request control message according to a tunneled services control function (TSCF) standard;
wherein the tunneling server translates the service request control message to a first TCP packet for initiating the connection;
wherein the tunneling server forwards the first TCP packet to the signaling server; and
wherein the encapsulation and the translation avoids creating a double stream stack.

17. The system of claim 16,
wherein the service request control message includes a first TSCF Type Length Value (TLV) indicating source and destination information corresponding to the connection.

18. The system of claim 17,
wherein, in response to the first TCP packet, the tunneling server receives a second TCP packet from the signaling server;
wherein the tunneling server translates the second TCP packet into a service response control message according to TSCF; and
wherein the tunneling server forwards the service response control message to the tunneling client.

19. The system of claim 18,
wherein the service response control message includes a second TSCF TLV indicating a connection identifier corresponding to the connection.

20. The system of claim 15,
wherein the connection is terminated by the tunneling client by sending a service request control message according to a tunneled services control function (TSCF) standard;
wherein the tunneling server translates the service request control message to a TCP packet for terminating the connection; and
wherein the tunneling server forwards the TCP packet to the signaling server.

\* \* \* \* \*

UNITED STATES PATENT AND TRADEMARK OFFICE
CERTIFICATE OF CORRECTION

| | | |
|---|---|---|
| PATENT NO. | : 10,015,287 B2 | Page 1 of 1 |
| APPLICATION NO. | : 14/638434 | |
| DATED | : July 3, 2018 | |
| INVENTOR(S) | : Herrero et al. | |

It is certified that error appears in the above-identified patent and that said Letters Patent is hereby corrected as shown below:

On the Title Page

Column 2, item (74) under Attorney Agent, or Firm, Line 1, delete "Potamac" and insert -- Potomac --, therefor.

In the Claims

In Column 12, Line 52, In Claim 15, after "server" insert -- ; --.

Signed and Sealed this
Ninth Day of April, 2019

Andrei Iancu
*Director of the United States Patent and Trademark Office*